US012003377B1

(12) United States Patent
Patil et al.

(10) Patent No.: US 12,003,377 B1
(45) Date of Patent: Jun. 4, 2024

(54) DISTRIBUTED COMPUTING SYSTEM WITH HYPERVISOR MOBILITY SERVICE

(71) Applicant: Microsoft Technology Licensing, LLC, Redmond, WA (US)

(72) Inventors: Shivjit Satish Patil, Chapel Hill, NC (US); Rupesh Bhagaban Patro, Redmond, WA (US); Kenyon James Hensler, Acworth, GA (US); Aishwarya Srinivasa Raghavan, Sammamish, WA (US); Rangaprasad Narasimhan, Sammamish, WA (US); Anand Ramakrishna, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/067,435

(22) Filed: Dec. 16, 2022

(51) Int. Cl.
*H04L 41/0895* (2022.01)
*G06F 9/455* (2018.01)
*H04L 61/5084* (2022.01)
*H04L 101/668* (2022.01)

(52) U.S. Cl.
CPC ...... *H04L 41/0895* (2022.05); *G06F 9/45558* (2013.01); *H04L 61/5084* (2022.05); *H04L 2101/668* (2022.05)

(58) Field of Classification Search
CPC ............. H04L 41/0895; H04L 61/5084; G06F 9/45558
See application file for complete search history.

(56) References Cited

U.S. PATENT DOCUMENTS

| 8,953,439 B1* | 2/2015 | Lin | H04L 45/54 370/219 |
| 2016/0117185 A1* | 4/2016 | Fang | H04L 45/50 718/1 |
| 2016/0119417 A1* | 4/2016 | Fang | H04L 12/4633 709/219 |

FOREIGN PATENT DOCUMENTS

WO   WO-2016069382 A1 *   5/2016   ......... G06F 9/45558

OTHER PUBLICATIONS

"NSX-T Data Center Migration Coordinator Guide," Retrieved from the Internet: URL: https://web.archive.org/web/20220403134315if_/https://docs.vmware.com/en/VMwareNSXTDataCenter/3.1/nsxt_31_migrate.pdf, Nov. 9, 2021, 229 Pages (Submitted in Two Parts).

(Continued)

*Primary Examiner* — Philip C Lee
(74) *Attorney, Agent, or Firm* — Alleman Hall & Tuttle LLP

(57) ABSTRACT

A distributed computing system is provided, including a server executing a mobility service, and a first computing device executing a first hypervisor implementing a first mobility client configured to detect an attachment of a virtual machine to the first hypervisor, and a second computing device executing a second hypervisor implementing a second mobility client configured to detect an attachment of the virtual machine to the second hypervisor, and send a message to the first computing device indicating the attachment of the virtual machine to the second hypervisor. The first mobility client is further configured to store network routing information indicating a network location of the virtual machine, receive network traffic for the virtual machine, and forward the network traffic to the second hypervisor based on the stored network routing information.

18 Claims, 6 Drawing Sheets

(56) References Cited

OTHER PUBLICATIONS

"VMware HCX 4.5 User Guide," Retrieved from the Internet: URL: https://web.archive.org/web/20230110000626if_/https://docs.vmware.com/en/VMware-HCX/4.5/hcx-user-guide-45.pdf, Oct. 13, 2022, 228 Pages. (Submitted in Two Parts).
International Search Report and Written Opinion received for PCT Application No. PCT/US23/036729, Feb. 22, 2024, 13 pages.
Rutgerblom, "HCX Your Way To NSX-T Overlay", Retrieved from the Internet: URL: https://rutgerblom.com/2021/01/03/hcxyourwaytonsxtoverlay/, Jan. 3, 2021, 34 Pages.

\* cited by examiner

| NETWORK ROUTING INFO. 122 | | |
|---|---|---|
| VM ADDRESS | VM ID | NEXT HOP ADDRESS |
| 192.168.1.1 | 01-23-45-67-... + 192... | 192.168.1.10 |
| 192.168.1.2 | 01-23-45-67-... + 192... | 192.168.1.42 |
| 192.168.1.3 | -- | 192.168.1.18 |
| ... | ... | ... |

FIG. 3A

| NETWORK ROUTING INFO. 122 | | |
|---|---|---|
| VM ADDRESS | VM ID | NEXT HOP ADDRESS |
| -- | -- | -- |
| 192.168.1.2 | 01-23-45-67-... + 192... | 192.168.1.42 |
| 192.168.1.1 | 01-23-45-67-... + 192... | 192.168.1.18 |
| ... | ... | ... |

FIG. 3B

DISTRIBUTED COMPUTING SYSTEM WITH HYPERVISOR MOBILITY SERVICE

BACKGROUND

Modern distributed computing systems provide a plurality of computing devices that communicate with one another across computer networks. Such distributed computing systems may offer a variety of services that enable clients to develop and deploy applications in the cloud. In a virtualized environment, virtual machines, in which software applications and other code may be executed, are managed by hypervisors executing on computing devices. Some virtual machines may migrate from one hypervisor to another hypervisor, for example due to insufficient resources at the source hypervisor or degradation in source hypervisor functioning. A virtual machine may have performance or availability requirements whose satisfaction may be challenged by its migration, however. For example, updating network routing information indicating the migration, in time for network traffic to be properly routed to the destination hypervisor where the virtual machine is now located, may be impracticable and cause delay noticeable to clients.

SUMMARY

A distributed computing system is provided, including a server executing a mobility service, and a first computing device executing a first hypervisor implementing a first mobility client configured to detect an attachment of a virtual machine to the first hypervisor, and a second computing device executing a second hypervisor implementing a second mobility client configured to detect an attachment of the virtual machine to the second hypervisor, and send a message to the first computing device indicating the attachment of the virtual machine to the second hypervisor. The first mobility client is further configured to store network routing information indicating a network location of the virtual machine, receive network traffic for the virtual machine, and forward the network traffic to the second hypervisor based on the stored network routing information.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 3A-3B depict an example update to network routing information, by the system of FIG. 1.

DETAILED DESCRIPTION

Modern distributed computing systems provide a plurality of computing devices that communicate with one another across computer networks. Such distributed computing systems may offer a variety of services that enable clients to develop and deploy applications in the cloud. In a virtualized environment, computing devices in a distributed computing system implement hypervisors that manage virtual machines in which software applications and other code may be executed. Various factors may arise that prompt a virtual machine to migrate from one hypervisor—implemented at one computing device—to another hypervisor implemented at another computing device. Such factors may include insufficient compute resources at the source hypervisor or computing device on which the source hypervisor is hosted, or degradation in the functioning of the source hypervisor. A virtual machine may have performance or availability requirements whose satisfaction may be challenged by the migration, however. For example, updating network routes that reflect the migration in time for network traffic to be properly routed to the destination hypervisor where the virtual machine is now located, and without packet loss and/or delays apparent to clients, may be impracticable. Performance loss and violation of service-level agreements may result. As one example, some types of software-defined networks, due to configuration and/or protocol usage, may exhibit significant delays in updating network routes. In addition to the aforementioned issues, delays in updating network routing may pose challenges to the functioning of virtual machines that form part of a hypervisor control plane, and the services within the distributed computing system that are dependent on those virtual machines.

Figure 1:
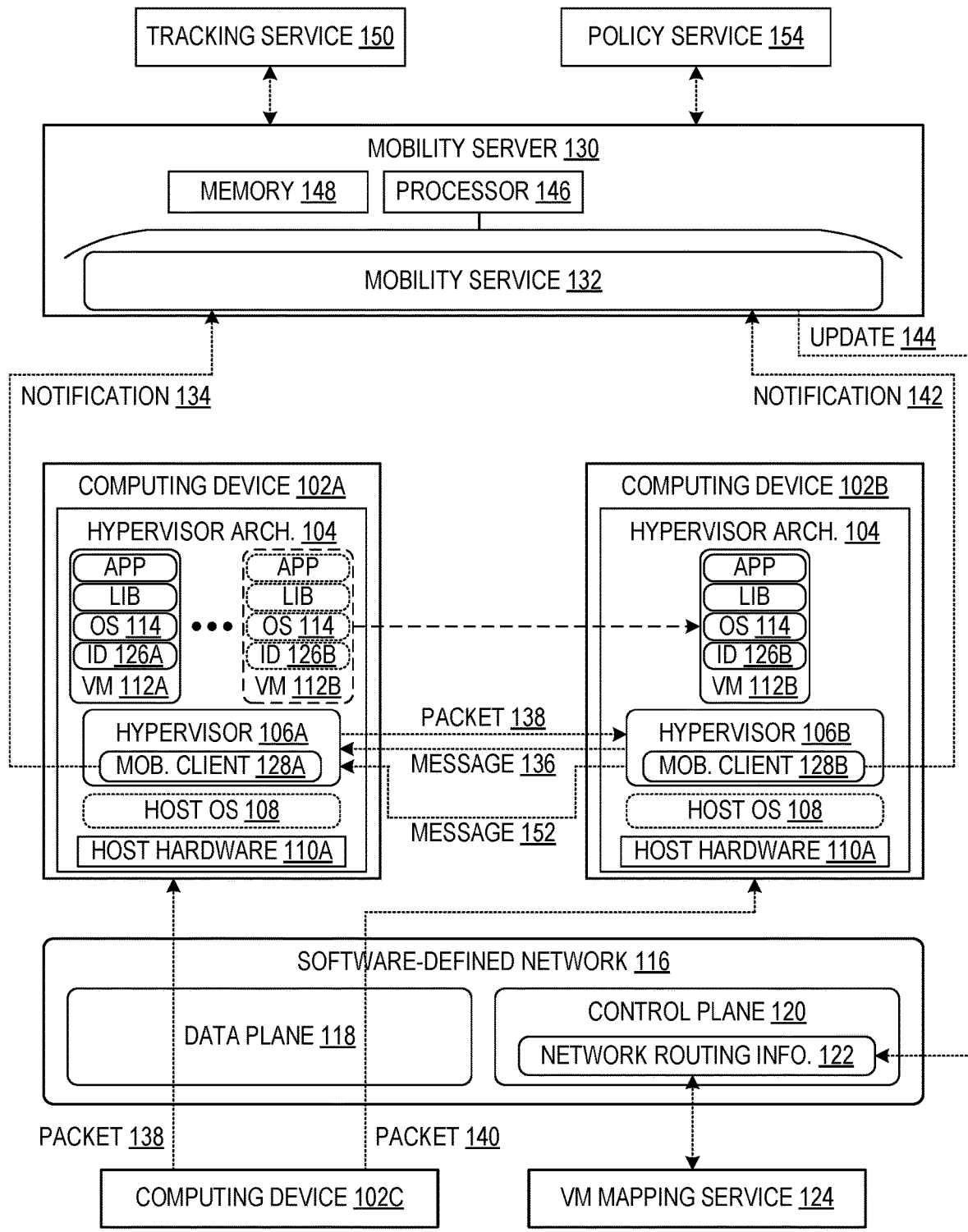
FIG. 1 shows a schematic view of an example computing system according to the present disclosure.

FIG. 1 depicts an example distributed computing system 100 that includes a plurality of computing devices 102 configured to provide a virtualized environment in which software applications and code may be executed in virtual machines. To this end, each computing device 102 implements a hypervisor architecture 104 that includes a hypervisor 106 executed on a host operating system (OS) 108. Host OS 108 is in turn executed on host hardware 110, which includes a processor and memory. Detail regarding example host and computing device hardware is described below with reference to FIG. 5. Hypervisor 106 provides a software interface between host OS 108 and a hypervisor control plane, and between the host OS and individual virtual machines 112 managed by the hypervisor. Further, each virtual machine 112 includes a guest OS instance 114, as well as libraries, binaries, and other data used by applications executed within the virtual machine 112. In some implementations, however, host OS 108 may be omitted.

Distributed computing system 100 includes a software-defined network (SDN) 116 configured to route network traffic in the computing system through a data plane 118, based on network routing information, policies, rules, and/or other configuration information set at a control plane 120 of the SDN. SDN 116 may be used to implement network routes along which network traffic in computing system 100 is routed, network topologies in which to organize networking in the computing system, enforce policies and rules, and perform other functions related to networking in the computing system. Network routes and topologies may be established at, in least in part, a logical level, with various physical networking devices (e.g., routers, switches) implementing such routes and topologies. To this end, SDN 116 maintains network routing information 122 describing network routes along which to route network traffic in computing system 100 and endpoints where network traffic is to be directed.

Network routing information 122 may additionally include mappings that each associate a virtual machine 112 with a corresponding hypervisor 106 to which the virtual machine is attached (e.g., managed by). SDN 116 may utilize such mappings to identify the hypervisor 106 or computing device 102 to which a virtual machine 112 is attached, thus enabling the SDN to determine where to route traffic intended for the virtual machine. In service of determining virtual machine-to-hypervisor mappings, SDN 116 may call a virtual machine mapping service 124, which responds with information regarding virtual machine-to-hypervisor mappings in computing system 100. In some implementations, virtual machines 112 may report to mapping service 124 with information identifying an attached hypervisor 106.

It will be understood that distributed computing system 100 may implement additional SDNs, other types of physical and/or logical networks, and/or any other suitable components to facilitate the networking, messaging, and mobility described herein. Further, SDN 116 may route network traffic received from any suitable source to any suitable destination. For example, SDN 116 may receive network traffic from sources within computing system 100, such as computing device 102A, and route the network traffic to destinations also within the computing system, such as computing device 102B. In some implementations, SDN 116 may additionally receive network traffic from sources outside of computing system 100, such as another distributed computing system that is remote from or otherwise external to the computing system 100. Alternatively or additionally, SDN 116 may route network traffic within computing system 100 to a destination outside of the computing system.

In some instances, a virtual machine 112 may migrate from one computing device 102 in distributed computing system 100 to another computing device in the computing system. As shown through the example of a virtual machine 112B, FIG. 1 depicts the migration of this virtual machine from computing device 102A to computing device 102B. Before the migration, virtual machine 112B is attached to a first hypervisor 106A executing on computing device 102A. As part of the migration, virtual machine 112B becomes unattached to first hypervisor 106A, and attaches to a second hypervisor 106B on computing device 102B, where the virtual machine may be executed. As discussed above, various factors may prompt the migration of virtual machines 112 in distributed computing system 100 from a source computing device to a destination computing device. Such factors may include insufficient compute resources at the source computing device, or source hypervisor managing the virtual machine, to support the functioning of the virtual machine, and/or degradation in the functioning of the source computing device or source hypervisor.

As a result of the migration of virtual machine 112B to computing device 102B, network routing information 122 maintained by SDN 116 is updated to reflect the migration and effect routing, of network traffic received at the SDN and intended for the virtual machine, to computing device 102B and hypervisor 106B where the virtual machine is located following migration. Network routing information 122 may be updated with the network location of virtual machine 112B as attached to hypervisor 106B. The network locations of virtual machines 112 in computing system 100 may be identified in any suitable manner. For example, the network location of virtual machine 112B may be identified based on an endpoint network address of computing device 102B where the virtual machine is located, which identifies the network location of the computing device and enables network traffic to be routed to the computing device, and also based on a virtual machine identifier 126, which identifies the virtual machine and enables network traffic to be routed to the virtual machine. Responsive to a change in the network location of a virtual machine 112, SDN 116 may further update one or more network routes that terminate or pass through the network location to facilitate proper routing to the current network location of the virtual machine.

In distributed computing system 100, a virtual machine identifier 126 is associated with each virtual machine 112 that uniquely identifies that virtual machine. Each virtual machine identifier 126 may include a binding of a hardware address (e.g., media access control (MAC) address) for a corresponding virtual machine 112, and a network address (e.g., internet protocol (IP) address) for the virtual machine. The network address for the virtual machine 112 may exist in a private address space (e.g., a private space for virtual machine network addresses), whereas the endpoint network address of a computing device 102 hosting the virtual machine may exist in a public address space (e.g., a public space visible to clients of computing system 100), for example. As described below, the hardware address/network address binding in a virtual machine identifier 126 may be encapsulated as metadata in a message that is addressed (e.g., in a packet header) to the endpoint network address of a computing device 102.

Due to factors that potentially include the configuration of SDN 116, protocol(s) employed by the SDN, and/or delays in reporting changes in attachment/location by virtual machines 112, there may exist a time period following the migration of virtual machine 112B to computing device 102B where network routing information 122 maintained by the SDN is not yet updated to reflect this migration. Before network routing information 122 is updated to reflect the migration, the routing information instead indicates that virtual machine 112B is attached to hypervisor 106A located at computing device 102A. Thus, in this time period SDN 116 routes network traffic intended for virtual machine 112B to computing device 102A based on the now outdated network routing information 122. Without a mechanism to redirect this traffic to the correct location where virtual machine 112B has migrated to—computing device 102B—such traffic may be dropped and fail to reach the virtual machine.

Figure 2B:
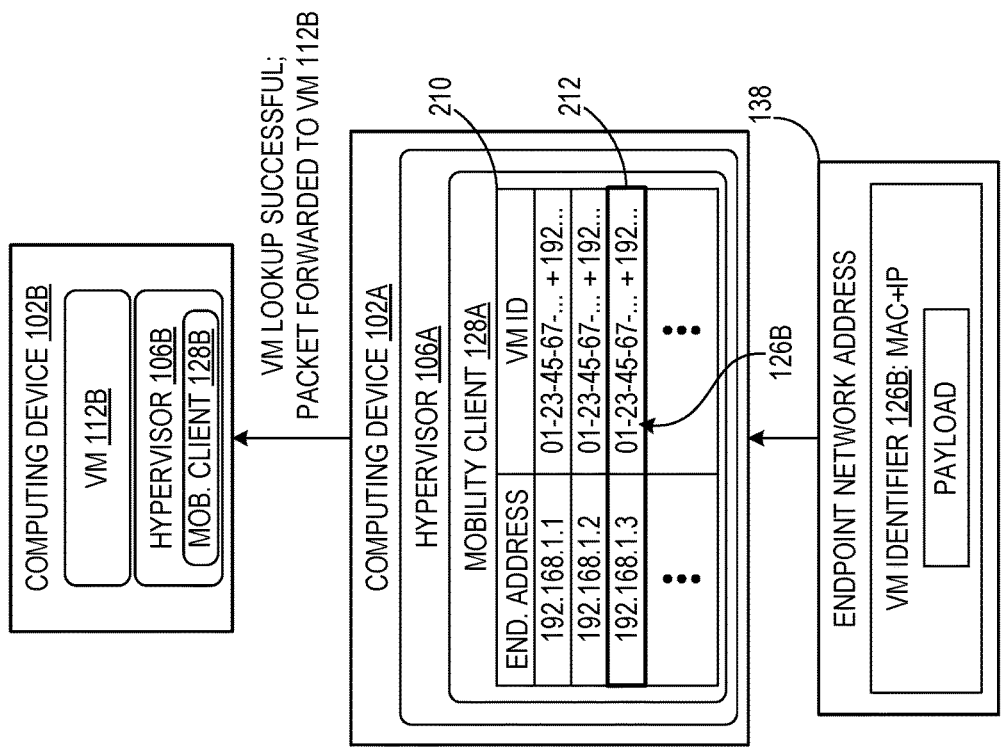
FIGS. 2A-2B depict examples of packet processing with and without a forwarding mechanism, by the system of FIG. 1.
Figure 2A:
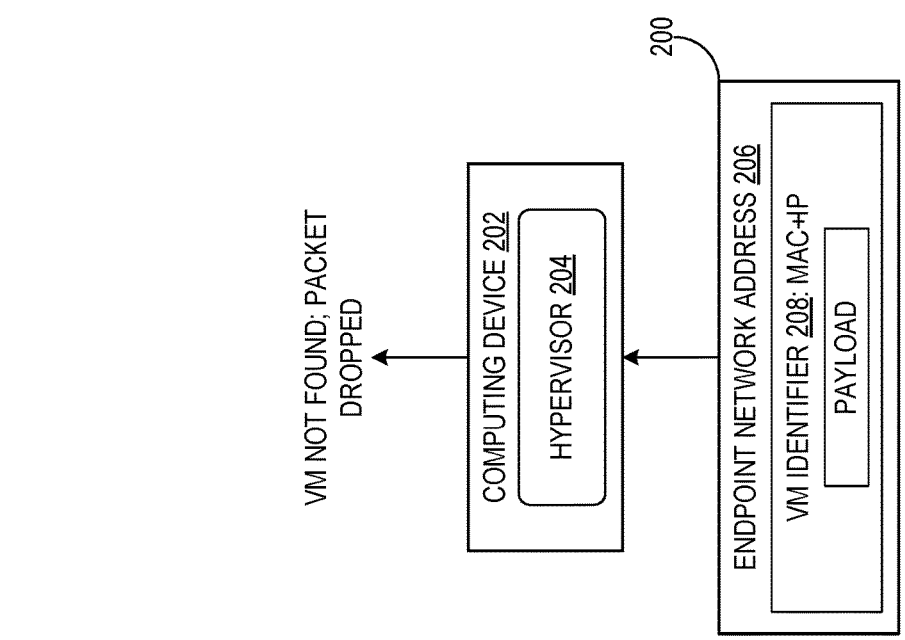

FIG. 2A depicts an example scenario in which a packet 200 intended for virtual machine 112B is routed (e.g., by SDN 116) to a computing device 202 implementing a hypervisor 204. Packet 200 is addressed to an endpoint network address (e.g., IP address) 206 associated with computing device 202, as now outdated network routing information erroneously indicates that virtual machine 112B is located at the computing device 202. Computing device 202 may have previously hosted virtual machine 112B, for example, whereas at the time packet 200 is routed to the computing device, the virtual machine has migrated to a different computing device. Packet 200 includes a virtual machine identifier 208 identifying virtual machine 112B, which in the depicted example includes a binding of a MAC address and an IP address both associated with virtual machine 112B. Virtual machine identifier 208 may be included in metadata that is encapsulated in packet 200, by endpoint network address 206, such that the virtual machine identifier may be obtained by decapsulating the packet and extracting the metadata, for example.

Computing device 202 receives packet 200, and via hypervisor 204, attempts to look up—e.g., in registration information identifying virtual machines attached to the computing device—virtual machine 112B. However, as virtual machine 112B is not located at computing device 202, this lookup fails, and no network location of the virtual machine is identified. Lacking a redirecting mechanism with which packet 200 may be forwarded to virtual machine 112B, the packet goes undelivered to the virtual machine and instead is dropped. Even with a redirecting mechanism that would enable the sender of packet 200 to be notified of the failed delivery and to resend the packet to the correct network location where virtual machine 112B is actually located, a significant delay may exist before the packet is successfully delivered the virtual machine. This delay may be apparent to clients of distributed computing system 100, potentially disruptive to workloads executing in the computing system, and may produce conditions that violate service-level agreements.

To address these challenges, hypervisors 106 at computing devices 102 implement mobility clients 128 that send messages—to other mobility clients at other hypervisors, as well as to a mobility server 130 implementing a mobility service 132—indicating the migration of virtual machines 112. Such computing device-to-computing device messaging, or hypervisor-to-hypervisor messaging, may indicate the network location of a virtual machine 112 following its migration, enabling a computing device 102 that previously hosted the virtual machine, yet continues to receive network traffic for the virtual machine, to forward the network traffic to the computing device that now hosts the virtual machine post-migration. In this way, delays in updating network routing information 122 maintained by SDN 116 may be tolerated without delaying the delivery of network traffic to the computing device 102 where the migrated virtual machine 112 is located, and without dropping packets that become part of forwarded traffic. From a client perspective, desired virtual machine performance, availability, and service level may be maintained in the presence of virtual machine migration, with delays associated with updating network routing information 122 at SDN 116 being obscured from clients.

In the example depicted in FIG. 1, prior to the migration of virtual machine 112B, the virtual machine is attached first hypervisor 106A. A mobility client 128A implemented at first hypervisor 106A detects this attachment and sends to mobility service 132 a notification 134 of the attachment of virtual machine 112B to the first hypervisor. When virtual machine 112B migrates to computing device 102B, a mobility client 128B implemented at second hypervisor 106B detects the attachment of the virtual machine to the second hypervisor and sends a message 136 to first computing device 102A indicating this attachment. Message 136 may cause mobility client 128A to refrain from further notifying mobility service 132 regarding the attachment of virtual machine 112B to computing device 102A. In some examples, mobility clients 128 may be configured to advertise (e.g., at regular intervals) virtual machine attachments to mobility service 132. In such examples, mobility service 132 may recognize that a virtual machine 112 is no longer attached to a computing device 102 upon detecting a lack of advertising from the mobility client 128 executed on that computing device.

In response to message 136, mobility client 128A stores network routing information indicating a network location of virtual machine 112B as attached to hypervisor 106B. As described above, the network location of virtual machine 112B may be identified based on virtual machine identifier 126B that identifies the virtual machine (e.g., a MAC address and IP address binding), and also based on an endpoint network address of computing device 102B where the virtual machine is located. Accordingly, message 136 may indicate the network location of virtual machine 112 through the inclusion of virtual machine identifier 122B and/or the endpoint network address. In other examples, the network location of virtual machine 112 may be inferred, at least in part, at computing device 102A based on message 136. Further, in some implementations, mobility clients 128 may employ address resolution protocol (ARP) to detect and/or communicate virtual machine attachments.

As described above, a delay may exist in updating network routing information 122 at SDN 116 that reflects the migration of virtual machine 112B to computing device 102B. During this time, computing device 102A—the computing device where virtual machine 112B was previously hosted prior to migration—may receive (e.g., at hypervisor 106A) network traffic intended for the virtual machine. FIG. 1 depicts an example in which a packet 138, intended for virtual machine 112B and sent by a computing device 102C, is received at SDN 116, which routes the packet to computing device 102A based on the now outdated network routing information 122 indicating that the virtual machine resides at computing device 102A.

FIG. 2B illustrates an example of how packet 138 may be processed at computing device 102A. In some examples, an attempt may be first made to lookup—e.g., at hypervisor 106A— virtual machine 112B in registration information identifying virtual machines 112 attached to computing device 102A. As virtual machine 112B is not located at computing device 102A post-migration, this lookup fails. As such, a lookup for virtual machine 112B may be performed at mobility client 128A within network routing information (e.g., stored at computing device 102A), which in the example of FIG. 2B is depicted in the form of a route table 210. Route table 210 includes entries that each identify a network location of a corresponding virtual machine. For virtual machine 112B, the lookup in route table 210 identifies an entry whose network location 212 includes virtual machine identifier 126B that matches the virtual machine identifier 126B included in packet 138. Network location 212 in some examples may include a private VM IP address of the virtual machine 112B and/or a network address of computing device 102B. With network routing information that identifies the network location 212 of virtual machine 112B at which to forward packet 138, mobility client 128A forwards the packet to this network location and thus to computing device 102B, where the packet is successfully received at the virtual machine hosted on the computing device. In contrast to the example depicted in FIG. 2A where packet 200 was dropped due to a lack of forwarding mechanism, the forwarding mechanism provided by mobility client 128A enables packet 138 to be successfully forwarded to its intended recipient, even though the packet was initially routed to an incorrect location.

Returning to FIG. 1, a packet 140 is further depicted that illustrates network routing following the migration of virtual machine 112B to computing device 102B, and after network routing information 122 has been updated at SDN 116 to reflect this migration. At this point, network routing information 122 indicates that virtual machine 112B resides at computing device 102B. As such, SDN 116 routes packet 140 through data plane 118 directly to computing device 102B (e.g., without being received or forwarded by computing device 102A) where the packet is received at virtual machine 112B.

As mentioned above, mobility clients 128 may advertise to or otherwise notify mobility service 132 regarding virtual machine attachments. Based on its knowledge of virtual machine attachments as informed at least through mobility client reporting, mobility service 132 is configured to update network routing information 122 at SDN 116 to reflect virtual machine migration and apprise the SDN of virtual machine attachments in distributed computing system 100 to enable proper routing of network traffic by the SDN. In the example depicted in FIG. 1, mobility client 128B, in addition to sending message 136 to computing device 102A indicating the attachment of the virtual machine 112B to hypervisor 106B, further sends a notification 142 to mobility service 132 indicating the attachment of the virtual machine to the hypervisor. In response to notification 142, mobility service 132 sends an update 144 to SDN 116 that causes network routing information 122 to be updated with the network location of virtual machine 112B as attached to hypervisor 106B.

FIGS. 3A-3B depict an example illustrating how network routing information 122 may be updated based on update 144. In this example, network routing information 122 includes a route table 300 comprising entries that each describe a network address of a corresponding computing device in distributed computing system 100, a virtual machine identifier of a virtual machine attached to the computing device, and a network address of a next hop associated a network route to the computing device and/or mobility client therein.

FIG. 3A depicts route table 300 as describing, among other computing devices and virtual machine attachments, the attachment of virtual machine 112B to computing device 102A. In this state, virtual machine 112B may be attached to computing device 102A—i.e., prior to its migration to computing device 102B— or the virtual machine may have migrated to computing device 102B, with SDN 116 not yet having received update 144 reflecting the migration. As such, route table 300 includes an entry 302 associating virtual machine identifier 126B of virtual machine 112B and a private VM network address with a network address associated with computing device 102A (e.g., next hop IP address).

FIG. 3B depicts route table 300 in an updated state in which the route table is updated based on update 144. Here, entry 302 is updated to reflect the lack of attachment of virtual machine 112B to computing device 102A— virtual machine identifier 126B is deleted from the entry to remove the association of the virtual machine with the computing device. Further, an entry 304 is updated to reflect the attachment of virtual machine 112B to computing device 102B—virtual machine identifier 126B is inserted into the entry along with its private VM network address and is associated with the network address corresponding to the computing device.

Generally, it will be understood that mobility service 132 may interact with SDN 116 to update and effect network routing in distributed computing system 100 in any suitable manner, including but not limited to injecting routes into network routing information 122 and/or route table 300. Further, in some implementations, mobility service 132 and/or mobility clients 128 may implement one or more protocols to effect the messaging and virtual machine mobility described herein. For example, mobility clients 128 may be configured to advertise border gateway protocol (BGP) messages, with mobility service 132 being configured as a BGP listener. In such examples, stored network routing information maintained by mobility clients 128 may include a BGP list. Further, mobility server 130 includes a processor 146 and memory 148 storing instructions executable by the processor to execute mobility service 132.

Other mechanisms that enable the identification of a hypervisor 106 or computing device 102 to which a virtual machine 112 is attached may be employed in distributed computing system 100. For example, a mobility client 128 implemented at a hypervisor 106 may be configured to, responsive to detecting the attachment of a virtual machine to the hypervisor, increment a mobility sequence number associated with the mobility client. With respect to the migration of virtual machine 112B, a mobility sequence number tracked by mobility client 128A at computing device 102A, and a mobility sequence number tracked by mobility client 128B at computing device 102B may be compared to identify which mobility sequence number is larger, with the computing device associated with the larger mobility sequence number being identified as the location of the virtual machine. As an example, FIG. 1 depicts a tracking service 150 configured to communicate with mobility service 132 to obtain respective mobility sequence numbers from each of mobility client 128A and mobility client 128B, and determine whether virtual machine 112B is attached to hypervisor 106A or hypervisor 106B by identifying the larger sequence number. Mobility sequence numbers may be evaluated at any other suitable location, however, to identify virtual machine attachments.

In response to the deletion of a virtual machine 112, a mobility client 128 may be configured to message other mobility clients indicating that the virtual machine, previously attached to a hypervisor 106 implementing the mobility client, is no longer attached to the hypervisor due to the virtual machine deletion. As an example, FIG. 1 depicts a message 152 sent from mobility client 128B to mobility client 128A indicating that virtual machine 112B has been deleted and thus is no longer attached to hypervisor 106B. Responsive to message 152, mobility client 128A may delete stored network routing information indicating the network location of virtual machine 112B as attached to hypervisor 106B. For example with reference to FIG. 2B, mobility client 128A may delete the entry in route table 210 that associates the network location of virtual machine 112B with computing device 102B.

In some examples, mobility clients 128 may send a notification of a virtual machine attachment to a policy service 154 configured to enforce policy-based routing for network traffic in distributed computing system 100. For example, in response to the attachment of virtual machine 112B to hypervisor 106A, mobility client 128A may send notification 134 to policy service 154 indicating this attachment. In other examples, mobility server 130 may report virtual machine attachments to policy service 154.

Policy service 154 may enforce any suitable type of policy-based routing. As one example, policy service 154 may enforce geographic compliance with the network and/or physical location of a virtual machine 112. In such an example, based on notification of the migration of a virtual machine 112, policy service 152 may identify the location of the virtual machine, and if the location does not satisfy a geographic compliance policy (e.g., is not among a whitelist of accepted locations or regions), the virtual machine may be moved to another location compliant with the policy, spun down, or have its compliance status reported to another entity. As another example, policy service 154 may enforce affinity rules that control what computing devices 102 virtual machines 112 are allowed to migrate to. For example, policy service 154 may stipulate that a group of virtual machines 112 executing a common workload in parallel are to be located at a common computing device 102 to obtain the computational efficiency of locality. In another example, policy service 154 may stipulate that no more than one virtual machine is to be hosted at a common hypervisor 106. Here, a second virtual machine 112 that attaches to the hypervisor 106 may be moved to another host computing device 102 to maintain the attachment of one virtual machine to the hypervisor. As yet another example, policy service 154 may enforce location-aware policies that control virtual machine migration based on client location—e.g., to provide access to virtual machines that are geographically closer to the client location than other virtual machines.

Figure 4A:
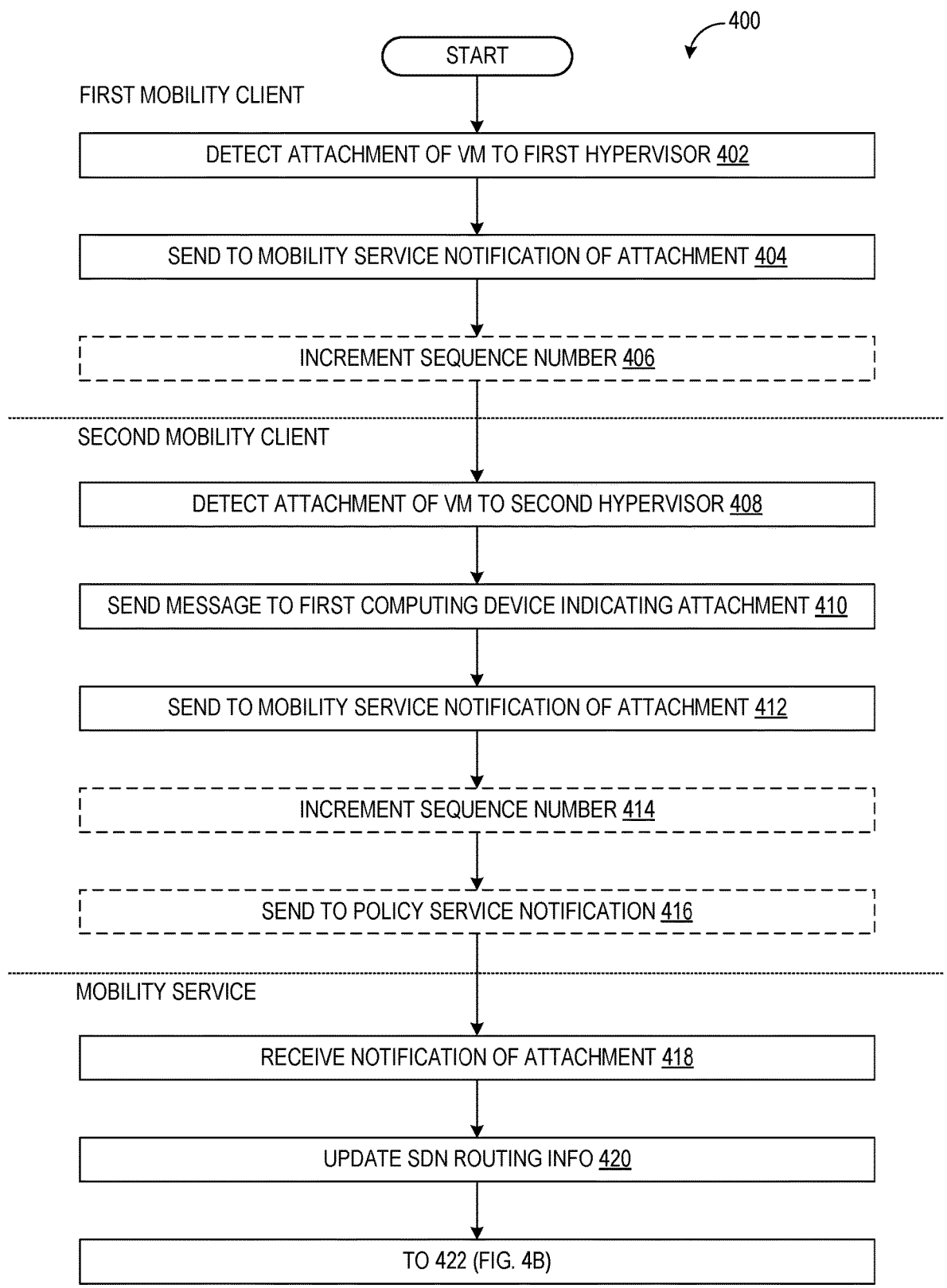
FIGS. 4A-4B depict a flowchart illustrating an example method.
Figure 4B:
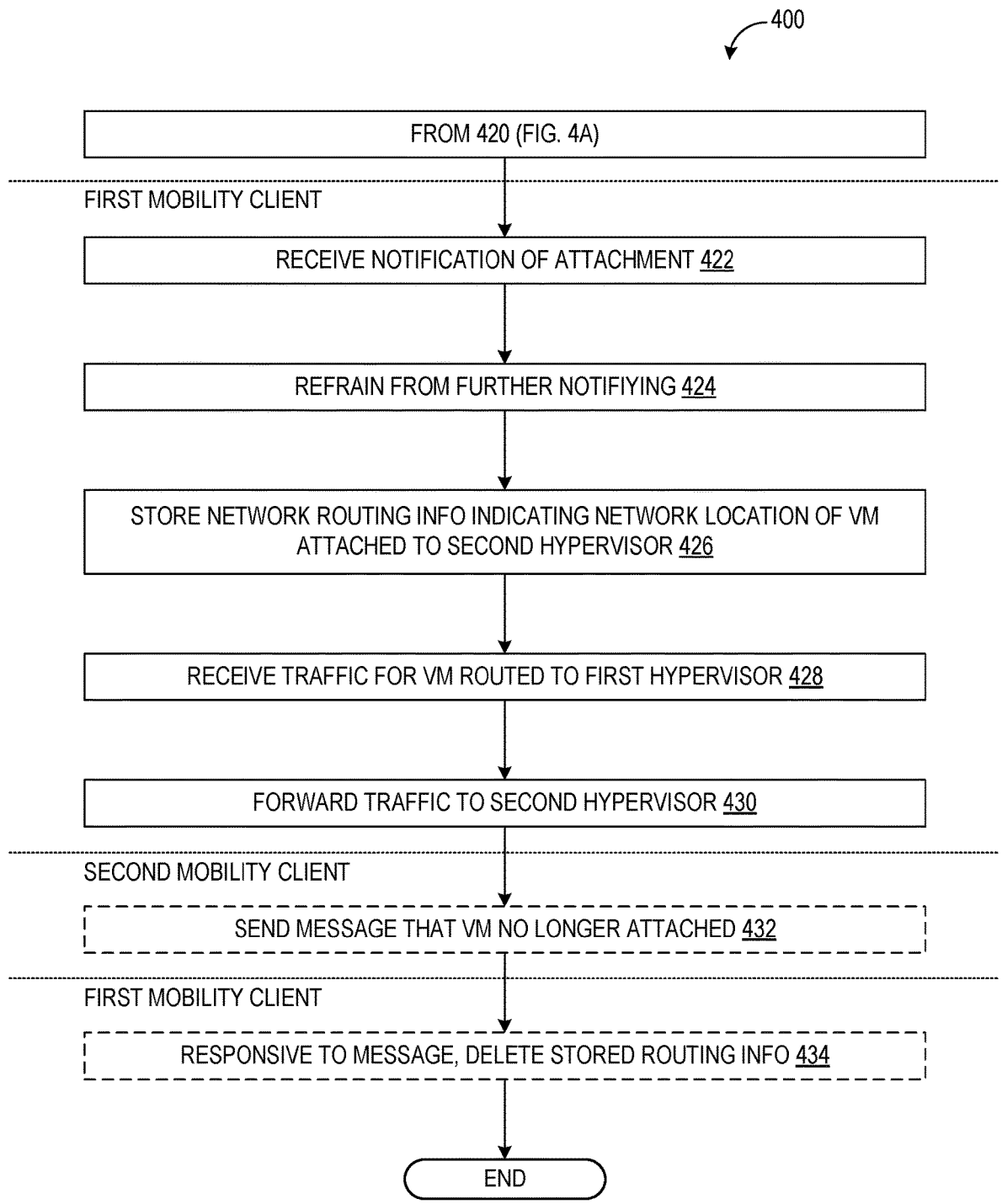

FIGS. 4A-4B depict a flowchart illustrating an example method 400. Method 400 may be implemented at distributed computing system 100, for example.

At 402, method 400 includes, at a first mobility client implemented by a first hypervisor executing on a first computing device, detecting an attachment of a virtual machine to the first hypervisor. At 404, method 400 includes, at the first mobility client, sending to a mobility service a notification of the attachment of the virtual machine to the first hypervisor. At 406, method 400 optionally includes, at the first mobility client, incrementing a first mobility sequence number.

At 408, method 400 includes, at a second mobility client implemented by a second hypervisor executing on a second computing device, detecting an attachment of the virtual machine to the second hypervisor. At 410, method 400 includes, at the second mobility client, sending to the first computing device a message indicating the attachment of the virtual machine to the second hypervisor. At 412, method 400 includes, at the second mobility client, sending to the mobility service a notification of the attachment of the virtual machine to the second hypervisor. At 414, method 400 optionally includes, at the second mobility client, incrementing a second mobility sequence number. In some examples, the first and second mobility sequence numbers may be compared (e.g., by a tracking service) to identify the larger of the sequence numbers, with the hypervisor or computing device associated with the larger sequence number being identified as currently being attached to the virtual machine. At 416, method 400 optionally includes, at the second mobility client, sending to a policy service the notification of the attachment of the virtual machine to the second hypervisor. The policy service may enforce policy-based routing of network traffic in the distributed computing system, for example.

At 418, method 400 includes, at the mobility service, receiving the notification of the attachment of the virtual machine to the second hypervisor. At 420, method 400 includes, at the mobility service, updating network routing information at a software-defined network. The software-defined network routing information may be updated with the network location of the virtual machine as attached to the second hypervisor, for example. Further, the software-defined network routing information may associate the network location with at least a next hop internet protocol (IP) address associated with a network route to the second mobility client. In some examples, the mobility service may inject one or more routes and/or other network routing information into one or more route tables maintained at the software-defined network.

At 422, method 400 includes, at the first mobility client, receiving the notification of the attachment of the virtual machine to the second hypervisor. At 424, method 400 includes, at the first mobility client, refraining from further notifying the mobility service of attachments of the virtual machine to the first hypervisor. At 426, method 400 includes, based at least on the message sent at 410 from the second mobility client, storing, at the first mobility client, network routing information indicating the network location of the virtual machine as attached to the second hypervisor. At 428, method 400 includes, at the first mobility client, receiving network traffic for the virtual machine that was routed to the first hypervisor at the first computing device. At 430, method 400 includes, at the first mobility client, forwarding the network traffic for the virtual machine from the first computing device to the second hypervisor implemented on the second computing device based on the stored network routing information.

At 432, method 400 optionally includes, at the second mobility client, sending a message to the first mobility client indicating that the virtual machine is no longer attached to the second hypervisor. At 434, method 400 optionally includes, at the first mobility client, responsive to the message indicating that the virtual machine is no longer attached to the second hypervisor, deleting the stored network routing information indicating the network location of the virtual machine as attached to the second hypervisor.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
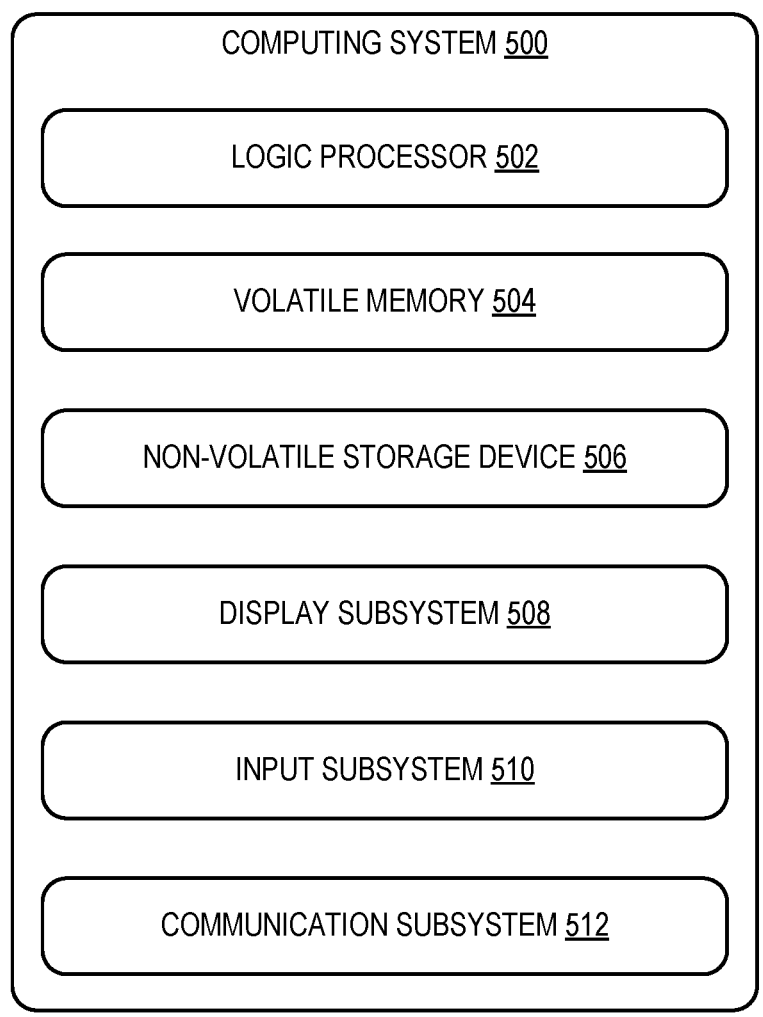
FIG. 5 depicts a block diagram of an example computing system that may be used to implement the system of FIG. 1.

FIG. 5 schematically shows a non-limiting embodiment of a computing system 500 that can enact one or more of the methods and processes described above. Computing system 500 is shown in simplified form. Computing system 500 may embody computer devices 102 and/or mobility server 130 described above and illustrated in FIG. 1. Computing system 500 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 500 includes a logic processor 502, volatile memory 504, and a non-volatile storage device 506. Computing system 500 may optionally include a display sub system 508, input sub system 510, communication sub system 512, and/or other components not shown in FIG. 5.

Logic processor 502 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 502 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 506 includes one or more physical devices configured to hold instructions executable by the logic processors to implement the methods and processes described herein. When such methods and processes are implemented, the state of non-volatile storage device 506 may be transformed—e.g., to hold different data.

Non-volatile storage device 506 may include physical devices that are removable and/or built-in. Non-volatile storage device 506 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 506 may include nonvolatile, dynamic, static, read/write, read-only, sequential-access, location-addressable, file-addressable, and/or content-addressable devices. It will be appreciated that non-volatile storage device 506 is configured to hold instructions even when power is cut to the non-volatile storage device 506.

Volatile memory 504 may include physical devices that include random access memory. Volatile memory 504 is typically utilized by logic processor 502 to temporarily store information during processing of software instructions. It will be appreciated that volatile memory 504 typically does not continue to store instructions when power is cut to the volatile memory 504.

Aspects of logic processor 502, volatile memory 504, and non-volatile storage device 506 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 500 typically implemented in software by a processor to perform a particular function using portions of volatile memory, which function involves transformative processing that specially configures the processor to perform the function. Thus, a module, program, or engine may be instantiated via logic processor 502 executing instructions held by non-volatile storage device 506, using portions of volatile memory 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 508 may be used to present a visual representation of data held by non-volatile storage device 506. The visual representation may take the form of a graphical user interface (GUI). As the herein described methods and processes change the data held by the non-volatile storage device, and thus transform the state of the non-volatile storage device, the state of display subsystem 508 may likewise be transformed to visually represent changes in the underlying data. Display subsystem 508 may include one or more display devices utilizing virtually any type of technology. Such display devices may be combined with logic processor 502, volatile memory 504, and/or non-volatile storage device 506 in a shared enclosure, or such display devices may be peripheral display devices.

When included, input subsystem 510 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 512 may be configured to communicatively couple various computing devices described herein with each other, and with other devices. Communication subsystem 512 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 500 to send and/or receive messages to and/or from other devices via a network such as the Internet.

Another example provides a distributed computing system comprising a server executing a mobility service, a first computing device executing a first hypervisor implementing a first mobility client configured to detect an attachment of a virtual machine to the first hypervisor, and send to the mobility service a notification of the attachment of the virtual machine to the first hypervisor, a second computing device executing a second hypervisor implementing a second mobility client configured to detect an attachment of the virtual machine to the second hypervisor, send a message to the first computing device indicating the attachment of the virtual machine to the second hypervisor, and send to the mobility service a notification of the attachment of the virtual machine to the second hypervisor, wherein the first mobility client is further configured to, based at least on the message, store network routing information indicating a network location of the virtual machine as attached to the second hypervisor, receive network traffic for the virtual machine that was routed to the first hypervisor at the first computing device, and forward the network traffic for the virtual machine from the first computing device to the second hypervisor implemented on the second computing device based on the stored network routing information. In such an example, the distributed computing system alternatively or additionally may comprise a software-defined network configured to receive network traffic for the virtual machine routed to the first hypervisor at the first computing device, when the virtual machine is attached to the second hypervisor, and based on software-defined network routing information indicating the attachment of the virtual machine to the first hypervisor, route the network traffic to the first computing device, wherein the first mobility client is configured to forward the network traffic routed to the first hypervisor to the second hypervisor implemented on the second computing device based on the stored network routing information. In such an example, the mobility service may be configured to update the software-defined network routing information with the network location of the virtual machine as attached to the second hypervisor. In such an example, the software-defined network routing information alternatively or additionally may associate the network location with at least a next hop internet protocol (IP) address associated with a network route to the second mobility client. In such an example, the stored network routing information alternatively or additionally may include a virtual machine identifier identifying the virtual machine and an endpoint internet protocol (IP) address of the second computing device. In such an example, the first mobility client alternatively or additionally may be configured to, responsive to detecting the attachment of the virtual machine to the first hypervisor, increment a first mobility sequence number, the second mobility client alternatively or additionally may be configured to, responsive to detecting the attachment of the virtual machine to the second hypervisor, increment a second mobility sequence number, and a tracking service may be configured to determine whether the virtual machine is attached to the first hypervisor or the second hypervisor based on determining which of the first mobility sequence number and the second mobility sequence number is larger. In such an example, the first mobility client alternatively or additionally may be configured to, responsive to receiving a message indicating that the virtual machine is no longer attached to the second hypervisor, delete the stored network routing information indicating the network location of the virtual machine as attached to the second hypervisor. In such an example, the virtual machine may form at least part of a hypervisor control plane. In such an example, the second mobility client alternatively or additionally may be configured to send to a policy service the notification of the attachment of the virtual machine to the second hypervisor, the policy service configured to enforce policy-based routing for network traffic in the distributed computing system.

Another example provides a method implemented at a distributed computing system, the method comprising, at a first mobility client implemented by a first hypervisor executing on a first computing device, detecting an attachment of a virtual machine to the first hypervisor, and sending to a mobility service a notification of the attachment of the virtual machine to the first hypervisor, at a second mobility client implemented by a second hypervisor executing on a second computing device, detecting an attachment of the virtual machine to the second hypervisor, sending to the first computing device a message indicating the attachment of the virtual machine to the second hypervisor, and sending to the mobility service a notification of the attachment of the virtual machine to the second hypervisor, at the first mobility client, based at least on the message, storing network routing information indicating a network location of the virtual machine as attached to the second hypervisor, receiving network traffic for the virtual machine that was routed to the first hypervisor at the first computing device, and forwarding the network traffic for the virtual machine from the first computing device to the second hypervisor implemented on the second computing device based on the stored network routing information. In such an example, the method alternatively or additionally may comprise, at a software-defined network, receiving network traffic for the virtual machine routed to the first hypervisor at the first computing device, when the virtual machine is attached to the second hypervisor, and based on software-defined network routing information indicating the attachment of the virtual machine to the first hypervisor, routing the network traffic to the first computing device, and at the first mobility client, forwarding the network traffic routed to the first hypervisor to the second hypervisor implemented on the second computing device based on the stored network routing information. In such an example, the method alternatively or additionally may comprise, at the mobility service, updating the software-defined network routing information with the network location of the virtual machine as attached to the second hypervisor. In such an example, the software-defined network routing information alternatively or additionally may associate the network location with at least a next hop internet protocol (IP) address associated with a network route to the second mobility client. In such an example, the stored network routing information alternatively or additionally may include a virtual machine identifier identifying the virtual machine and an endpoint internet protocol (IP) address of the second computing device. In such an example, the method alternatively or additionally may comprise, at the first mobility client, responsive to detecting the attachment of the virtual machine to the first hypervisor, incrementing a first mobility sequence number, at the second mobility client, responsive to detecting the attachment of the virtual machine to the second hypervisor, incrementing a second mobility sequence number, and, at a tracking service, determining whether the virtual machine is attached to the first hypervisor or the second hypervisor based on determining which of the first mobility sequence number and the second mobility sequence number is larger. In such an example, the method alternatively or additionally may comprise, at the first mobility client, responsive to receiving a message indicating that the virtual machine is no longer attached to the second hypervisor, deleting the stored network routing information indicating the network location of the virtual machine as attached to the second hypervisor. In such an example, the virtual machine may form at least part of a hypervisor control plane.

Another example provides a distributed computing system, comprising a server executing a mobility service, a first computing device executing a first hypervisor implementing a first mobility client configured to detect an attachment of a virtual machine to the first hypervisor, and send to the mobility service a notification of the attachment of the virtual machine to the first hypervisor, a second computing device executing a second hypervisor implementing a second mobility client configured to detect an attachment of the virtual machine to the second hypervisor, send to the first computing device a message indicating the attachment of the virtual machine to the second hypervisor, and send to the mobility service a notification of the attachment of the virtual machine to the second hypervisor, a software-defined network configured to receive network traffic for the virtual machine routed to the first hypervisor at the first computing device, when the virtual machine is attached to the second hypervisor, and based on software-defined network routing information indicating the attachment of the virtual machine to the first hypervisor, route the network traffic to the first computing device, wherein the first mobility client is further configured to, based at least on the message, store network routing information indicating a network location of the virtual machine as attached to the second hypervisor, the stored network routing information including a virtual machine identifier identifying the virtual machine and an endpoint internet protocol (IP) address of the second computing device, receive network traffic for the virtual machine that was routed to the first hypervisor at the first computing device, and forward the network traffic for the virtual machine from the first computing device to the second hypervisor implemented on the second computing device based on the stored network routing information. In such an example, the mobility service may be configured to update the software-defined network routing information with the network location of the virtual machine as attached to the second hypervisor. In such an example, the software-defined network routing information alternatively or additionally may associate the network location with at least a next hop internet protocol (IP) address associated with a network route to the second mobility client.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A distributed computing system, comprising:
a server executing a mobility service;
a first computing device executing a first hypervisor implementing a first mobility client configured to:
detect an attachment of a virtual machine to the first hypervisor;
responsive to detecting the attachment of the virtual machine to the first hypervisor, increment a first mobility sequence number; and
send to the mobility service a notification of the attachment of the virtual machine to the first hypervisor;
a second computing device executing a second hypervisor implementing a second mobility client configured to:
detect an attachment of the virtual machine to the second hypervisor;
send a message to the first computing device indicating the attachment of the virtual machine to the second hypervisor;
responsive to detecting the attachment of the virtual machine to the second hypervisor, increment a second mobility sequence number; and
send to the mobility service a notification of the attachment of the virtual machine to the second hypervisor,
wherein the first mobility client is further configured to:
based at least on the message, store network routing information indicating a network location of the virtual machine as attached to the second hypervisor;
receive network traffic for the virtual machine that was routed to the first hypervisor at the first computing device; and
forward the network traffic for the virtual machine from the first computing device to the second hypervisor implemented on the second computing device based on the stored network routing information, and
wherein a tracking service determines whether the virtual machine is attached to the first hypervisor or the second hypervisor based on determining which of the first mobility sequence number and the second mobility sequence number is larger.

2. The computing system of claim 1, further comprising a software-defined network configured to:
receive network traffic for the virtual machine routed to the first hypervisor at the first computing device, when the virtual machine is attached to the second hypervisor; and
based on software-defined network routing information indicating the attachment of the virtual machine to the first hypervisor, route the network traffic to the first computing device,
wherein the first mobility client is configured to forward the network traffic routed to the first hypervisor to the second hypervisor implemented on the second computing device based on the stored network routing information.

3. The computing system of claim 1, wherein the mobility service is configured to update the software-defined network routing information with the network location of the virtual machine as attached to the second hypervisor.

4. The computing system of claim 3, wherein the software-defined network routing information associates the network location with at least a next hop internet protocol (IP) address associated with a network route to the second mobility client.

5. The computing system of claim 1, wherein the stored network routing information includes a virtual machine identifier identifying the virtual machine and an endpoint internet protocol (IP) address of the second computing device.

6. The computing system of claim 1, wherein the first mobility client is further configured to, responsive to receiving a message indicating that the virtual machine is no longer attached to the second hypervisor, delete the stored network routing information indicating the network location of the virtual machine as attached to the second hypervisor.

7. The computing system of claim 1, wherein the virtual machine forms at least part of a hypervisor control plane.

8. The computing system of claim 1, wherein the second mobility client is further configured to send to a policy service the notification of the attachment of the virtual machine to the second hypervisor, the policy service configured to enforce policy-based routing for network traffic in the distributed computing system.

9. A method implemented at a distributed computing system, the method comprising:
at a first mobility client implemented by a first hypervisor executing on a first computing device,
detecting an attachment of a virtual machine to the first hypervisor;
responsive to detecting the attachment of the virtual machine to the first hypervisor, incrementing a first mobility sequence number; and
sending to a mobility service a notification of the attachment of the virtual machine to the first hypervisor;
at a second mobility client implemented by a second hypervisor executing on a second computing device,
detecting an attachment of the virtual machine to the second hypervisor;
sending to the first computing device a message indicating the attachment of the virtual machine to the second hypervisor;

responsive to detecting the attachment of the virtual machine to the second hypervisor, incrementing a second mobility sequence number; and sending to the mobility service a notification of the attachment of the virtual machine to the second hypervisor;

determining, by a tracking service, whether the virtual machine is attached to the first hypervisor or the second hypervisor based on determining which of the first mobility sequence number and the second mobility sequence number is larger; and at the first mobility client, when the virtual machine is determined to be attached to the second hypervisor, based at least on the message, storing network routing information indicating a network location of the virtual machine as attached to the second hypervisor;

receiving network traffic for the virtual machine that was routed to the first hypervisor at the first computing device; and forwarding the network traffic for the virtual machine from the first computing device to the second hypervisor implemented on the second computing device based on the stored network routing information.

10. The method of claim 9, further comprising:

at a software-defined network, receiving network traffic for the virtual machine routed to the first hypervisor at the first computing device, when the virtual machine is attached to the second hypervisor; and based on software-defined network routing information indicating the attachment of the virtual machine to the first hypervisor, routing the network traffic to the first computing device; and at the first mobility client, forwarding the network traffic routed to the first hypervisor to the second hypervisor implemented on the second computing device based on the stored network routing information.

11. The method of claim 9, further comprising, at the mobility service, updating the software-defined network routing information with the network location of the virtual machine as attached to the second hypervisor.

12. The method of claim 11, wherein the software-defined network routing information associates the network location with at least a next hop internet protocol (IP) address associated with a network route to the second mobility client.

13. The method of claim 9, wherein the stored network routing information includes a virtual machine identifier identifying the virtual machine and an endpoint internet protocol (IP) address of the second computing device.

14. The method of claim 9, further comprising, at the first mobility client, responsive to receiving a message indicating that the virtual machine is no longer attached to the second hypervisor, deleting the stored network routing information indicating the network location of the virtual machine as attached to the second hypervisor.

15. The method of claim 9, wherein the virtual machine forms at least part of a hypervisor control plane.

16. A distributed computing system, comprising:

a server executing a mobility service;

a first computing device executing a first hypervisor implementing a first mobility client configured to:

detect an attachment of a virtual machine to the first hypervisor;

responsive to detecting the attachment of the virtual machine to the first hypervisor, increment a first mobility sequence number; and send to the mobility service a notification of the attachment of the virtual machine to the first hypervisor;

a second computing device executing a second hypervisor implementing a second mobility client configured to:

detect an attachment of the virtual machine to the second hypervisor;

send to the first computing device a message indicating the attachment of the virtual machine to the second hypervisor;

responsive to detecting the attachment of the virtual machine to the second hypervisor, increment a second mobility sequence number; and send to the mobility service a notification of the attachment of the virtual machine to the second hypervisor, a software-defined network configured to:

receive network traffic for the virtual machine routed to the first hypervisor at the first computing device, when the virtual machine is attached to the second hypervisor; and based on software-defined network routing information indicating the attachment of the virtual machine to the first hypervisor, route the network traffic to the first computing device, wherein the first mobility client is further configured to:

based at least on the message, store network routing information indicating a network location of the virtual machine as attached to the second hypervisor, the stored network routing information including a virtual machine identifier identifying the virtual machine and an endpoint internet protocol (IP) address of the second computing device;

receive network traffic for the virtual machine that was routed to the first hypervisor at the first computing device; and forward the network traffic for the virtual machine from the first computing device to the second hypervisor implemented on the second computing device based on the stored network routing information, and wherein a tracking service determines whether the virtual machine is attached to the first hypervisor or the second hypervisor based on determining which of the first mobility sequence number and the second mobility sequence number is larger.

17. The distributed computing system of claim 16, wherein the mobility service is configured to update the software-defined network routing information with the network location of the virtual machine as attached to the second hypervisor.

18. The distributed computing system of claim 16, wherein the software-defined network routing information associates the network location with at least a next hop internet protocol (IP) address associated with a network route to the second mobility client.

* * * * *